(12) United States Patent
Crew

(10) Patent No.: US 10,792,135 B1
(45) Date of Patent: Oct. 6, 2020

(54) DENTAL TOOL SUPPORT

(71) Applicant: Courtney Crew, The Colony, TX (US)

(72) Inventor: Courtney Crew, The Colony, TX (US)

(*) Notice: Subject to any disclaimer, the term of this patent is extended or adjusted under 35 U.S.C. 154(b) by 37 days.

(21) Appl. No.: 16/196,904

(22) Filed: Nov. 20, 2018

Related U.S. Application Data

(60) Provisional application No. 62/588,445, filed on Nov. 20, 2017.

(51) Int. Cl.
| A61C 17/00 | (2006.01) |
| A61C 17/06 | (2006.01) |
| A61C 17/02 | (2006.01) |

(52) U.S. Cl.
CPC .......... *A61C 17/04* (2013.01); *A61C 17/0208* (2013.01); *A61C 17/0202* (2013.01)

(58) Field of Classification Search
CPC .. A61C 17/04; A61C 17/0208; A61C 17/0202
See application file for complete search history.

(56) References Cited

U.S. PATENT DOCUMENTS

| 2,947,564 A * | 8/1960 | Winther ............... B25J 1/04 294/100 |
| 5,127,830 A * | 7/1992 | Sheridan ............. A61C 1/16 433/77 |
| 5,572,913 A * | 11/1996 | Nasiell ............... B25B 13/481 81/177.6 |
| 8,096,807 B2 * | 1/2012 | Benfield ............. A61G 15/16 433/77 |
| 2004/0025641 A1 * | 2/2004 | Sugano .............. H01K 3/32 81/53.11 |
| 2014/0137811 A1 * | 5/2014 | Kovarik .............. B25J 1/02 119/796 |

* cited by examiner

Primary Examiner — Steven O Douglas
(74) Attorney, Agent, or Firm — Jeffrey Roddy

(57) ABSTRACT

A flexible support for a dental tool includes a distal holder configured to securely hold the dental tool which may be quickly released, the flexible support includes an anchoring member configured to fit within a tool recess of a tool cradle, the anchoring member includes a diameter that may decrease or increase depending on movement of a central member within the anchoring member that actuates displaceable members such that the anchoring member quickly conforms to grip sides of the tool cradle and quickly releases therefrom.

4 Claims, 8 Drawing Sheets

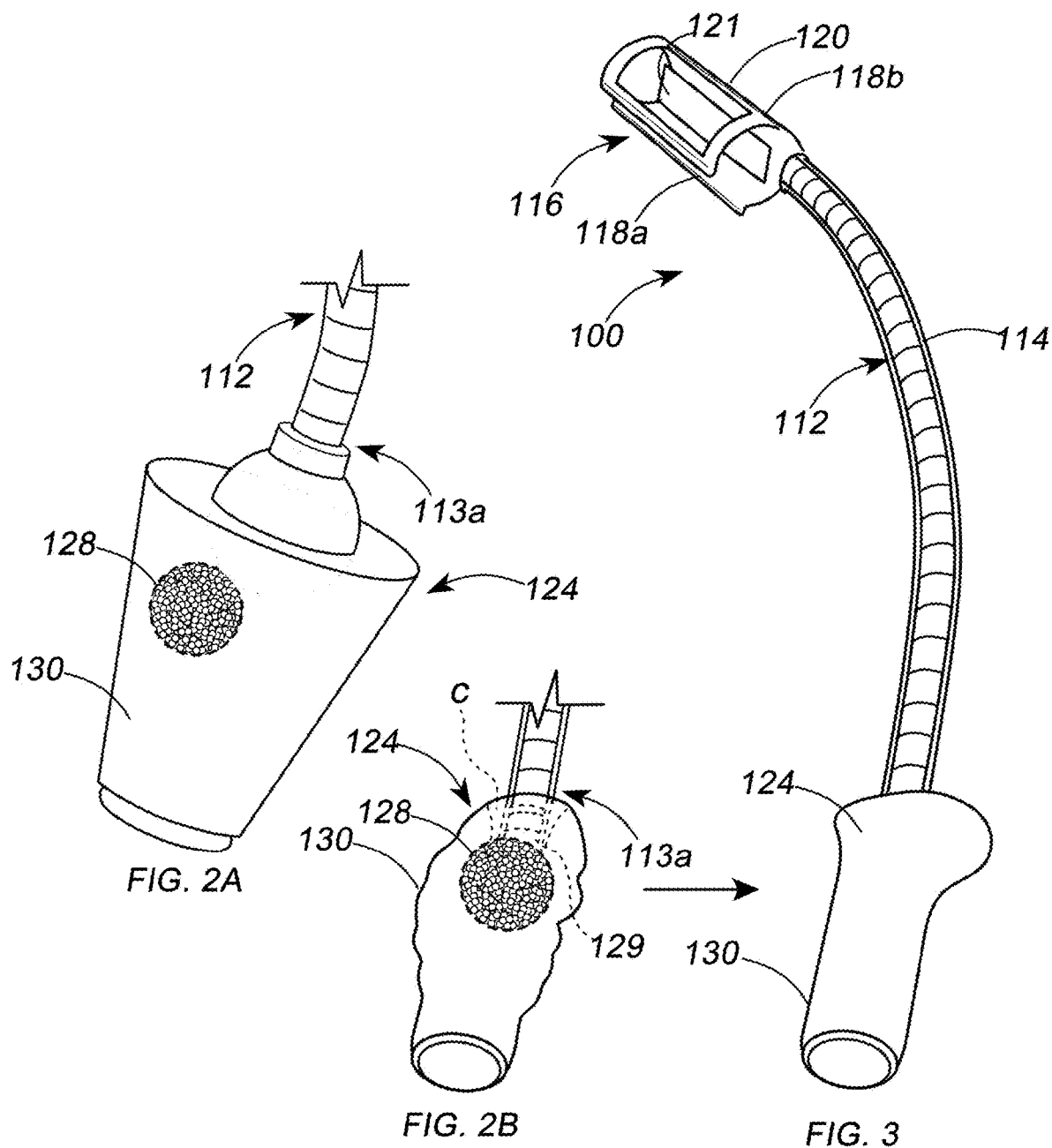

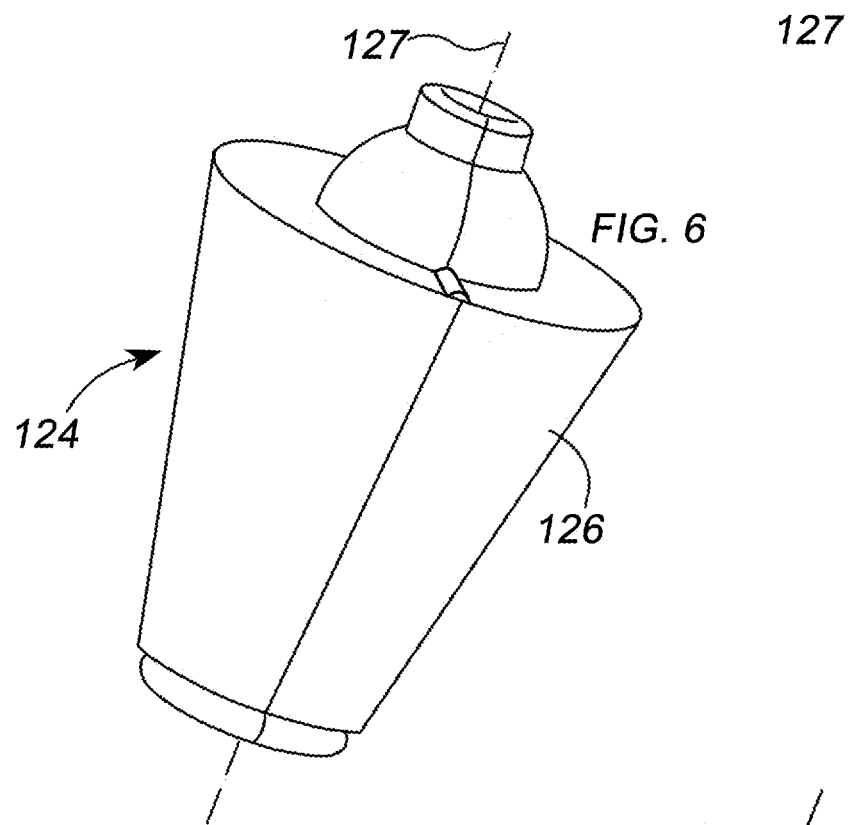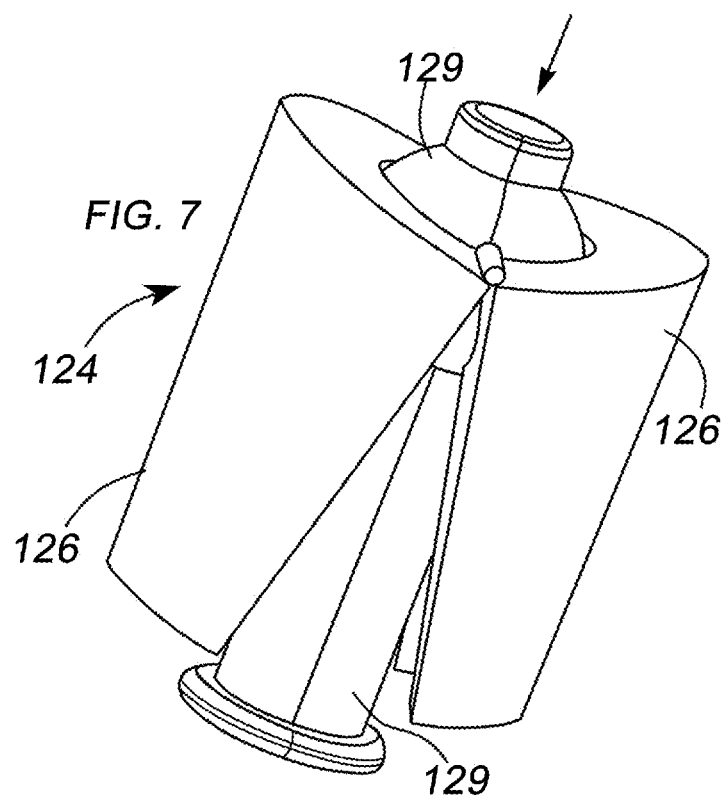

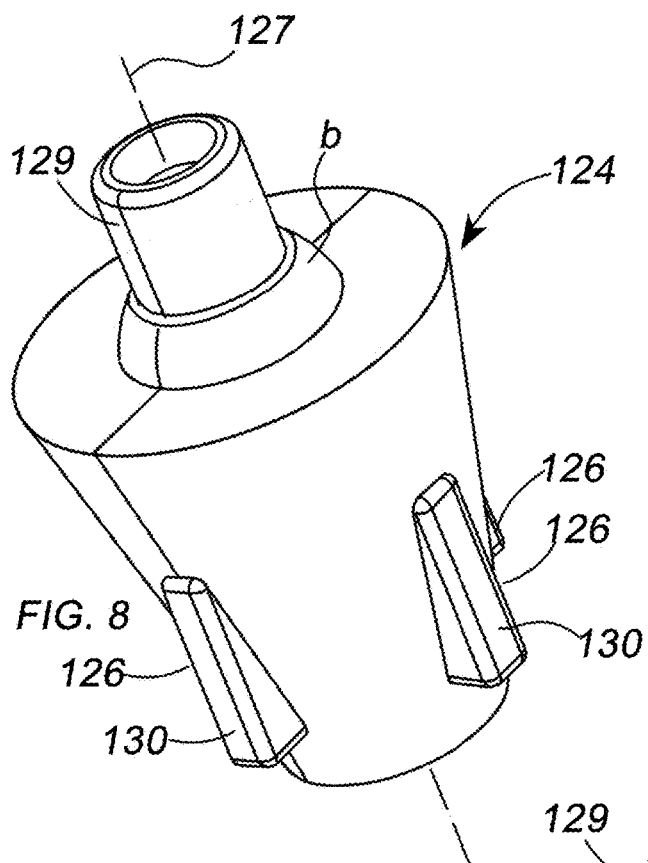
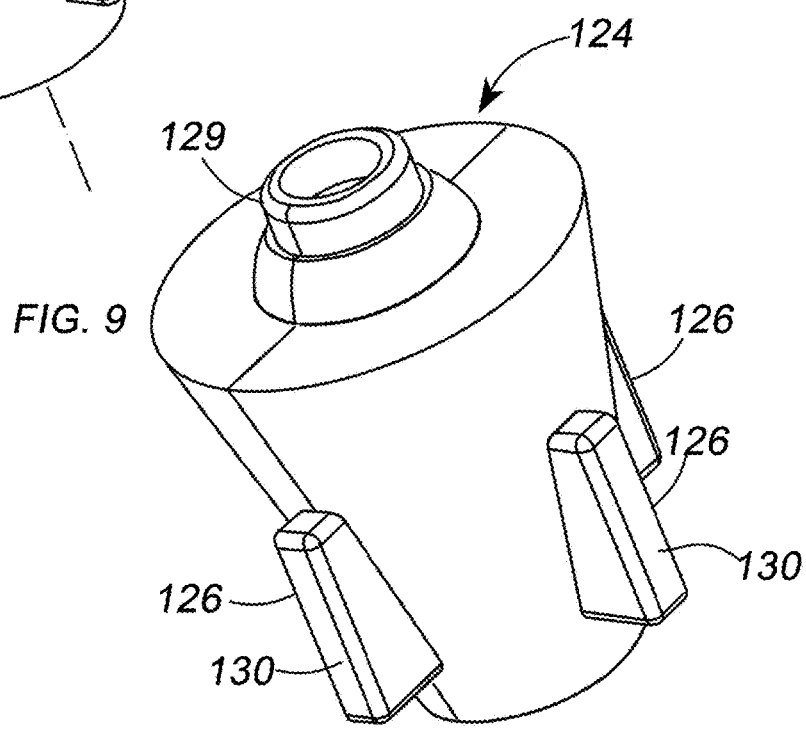

DENTAL TOOL SUPPORT

CROSS REFERENCES TO RELATED APPLICATIONS

This Non-Provisional Utility Application claims the benefit of U.S. Provisional Application No. 62/258,445 filed Nov. 20, 2017, entitled "Dental Tool Support."

FIELD OF THE INVENTION

The present invention relates generally to an apparatus for configured to support a dental suction tool.

BACKGROUND OF THE INVENTION

The present invention is support for a dental suction device. Dental suction devices, are used to remove saliva from a patient's mouth during dental hygiene procedures, e.g., cleaning are classified generally as LVE "low volume evacuators." In any case, dental suction devices include a handpiece with a valve control switch, a nozzle called a "saliva ejector" and a vacuum hose. Typically, the dental suction device is supplied in a set that also includes a water syringe tool and both are usually maintained in an upright position in a tool cradle or dock that is designed to loosely secure the tools for ready access. Although there are many different manufacturers of dental hygienist/dental assistant tools and the corresponding tool cradles, the shape of the tool handles tend to be somewhat similar irrespective of the make or model. Accordingly, because the tool cradles are configured to easily receive and deploy the tools by supporting the tool handles in a readily releasable upright position, the tool cradles tend to possess similar morphology—possessing a generally conic cavity with the greater diameter of the cavity facing up. Typically, during a single cleaning procedure, a dental hygienist/dental assistant may go back and forth multiple times to and from the tool cradle to dock and retrieve the particular tool being used. Due to time constraints, the position of the dental hygienist/dental assistant relative to the patient, or the inability to position the tool cradle within reach, the hygienist may resort to simply keeping the suction device in his or her lap for better access than what is provided by the tool cradle.

Accordingly, what is needed is flexible holder for a suction device that maintains the suction device in a ready position directly adjacent the work area, e.g., a patient's mouth.

It would be desirable if the flexible support may be pivoted toward and away from the work area.

It would be desirable if the forgoing flexible support were to include a quick release tool grip at one end of flexible support to allow for the quick attachment and detachment of a dental suction device to a distal end of the holder.

It would be desirable if the foregoing flexible support were to include a quick release cradle grip at a proximal end of the flexible support configured to tightly fill the space usually occupied by the dental suction device when the device is not in use.

It would be desirable if the foregoing quick release cradle grip were configured to adapt to any tool cradle shape or size.

It would be desirable if anchoring portions of the foregoing flexible support were configured to firmly grip and bind to the sides of a tool cradle, being laterally immobilized therein when a portion of the holder is pushed downwardly, and to release from the sides of the tool cradle when pulled upwardly by the dental hygienist/dental assistant or the dentist.

SUMMARY OF THE INVENTION

In accordance with various implementations described herein, a flexible support for a dental tool provides a quick attachment and release function for a dental tool secured at a distal end of the flexible support and a quick attachment and release function for an anchoring portion at a proximal end of the flexible support.

In a general aspect of the present invention, a flexible member is configured to hold a set position. The flexible member is attached to an anchoring portion that includes a conformable member coupled to a proximal end of the flexible member, the conformable member includes a central axis and one or more displaceable members and one or more slip resistant portions circumjacent the axis that enable the conformable member to conform to sides of a dental tool holder or tool cradle when the conformable member is pressed into a tool recess of the cradle.

In another aspect of the present invention combinable with any other aspect described herein, some displaceable members may, when pressed into the tool recess of the cradle, be forced from a position relatively close to the axis to a position further away from the axis, thereby increasing the diameter of the conformable member.

In another aspect of the present invention, combinable with any other aspect described herein, the proximal end of the flexible member within the conformable member may be coaxial with the conformable member.

In another aspect of the present invention, combinable with any other aspect described herein, some displaceable members may abut or otherwise interact with the proximal end of the flexible member within the conformable member.

In another aspect of the present invention, combinable with any other aspect described herein, movement of the proximal end of the flexible member within the conformable member may displace one or more displaceable members.

In another aspect of the present invention, combinable with any other aspect described herein, the displaceable members may be displaced radially by the downward moment of the proximal end of the flexible member within the conformable member.

In another aspect of the present invention, combinable with any other aspect described herein, the displaceable members may move closer to the axis of the conformable member when the proximal end of the flexible member is retracted.

In another aspect of the present invention, combinable with any other aspect described herein, the displaceable members may be a plurality of spherical beads within a lubricative matrix that retract generally toward the axis when the proximal end of the flexible member is retracted from a prior down position.

In another aspect of the present invention, combinable with any other aspect described herein, the displaceable members may be a plurality of slidable members that include a back and forth reciprocating motion when the proximal end of the flexible member within the conformable member is pulled up or forced downwardly which may be by pushing the flexible member from the top or pulling the flexible member from the bottom of portions extend from the bottom of the tool holder apparatus.

In another aspect of the present invention, combinable with any other aspect described herein, an outer portion of the conformable member may include a non-slip layer which may be an elastomeric composition.

In another aspect of the present invention, combinable with any other aspect described herein, the displaceable members may reside beneath an elastomeric cover.

In still another aspect of the present invention, combinable with any other aspect described herein, a distal end of the flexible member includes a tool attachment piece for the handle portion of a dental tool.

In another aspect of the present invention, combinable with any other aspect described herein, the tool attachment piece for the dental tool handle includes portions that partially conform to the dental tool handle.

In another aspect of the present invention, combinable with any other aspect described herein, the tool attachment piece for the dental tool handle may include soft compressible portions that partially conform to the handle.

In another aspect of the present invention, combinable with any other aspect described herein, the tool attachment piece for the dental tool handle may include a magnetic catch.

In another aspect of the present invention, combinable with any other aspect described herein, the tool attachment piece for the dental tool handle may include a magnetic catch that interacts with a magnetic member placed on the handle.

It will be appreciated by those having skill in the art that the overall size and dimensions of the flexible support for a dental tool may vary.

The foregoing and other objects, features, and advantages of the invention will become more apparent from the following detailed description, which proceeds with reference to the accompanying figures wherein the scale depicted is approximate.

BRIEF DESCRIPTION OF THE DRAWINGS

FIGS. 2A and 2B are partial views of various implementations in accordance with the present invention;

FIG. 3 is a perspective view thereof;

FIGS. 6 and 7 are isometric views of another implementation in accordance with the present invention showing a conformable member;

FIGS. 8 and 9 are isometric views of yet another implementation in accordance with the present invention;

DETAILED DESCRIPTION OF THE INVENTION

Reference Listing of Elements

Figure 1:
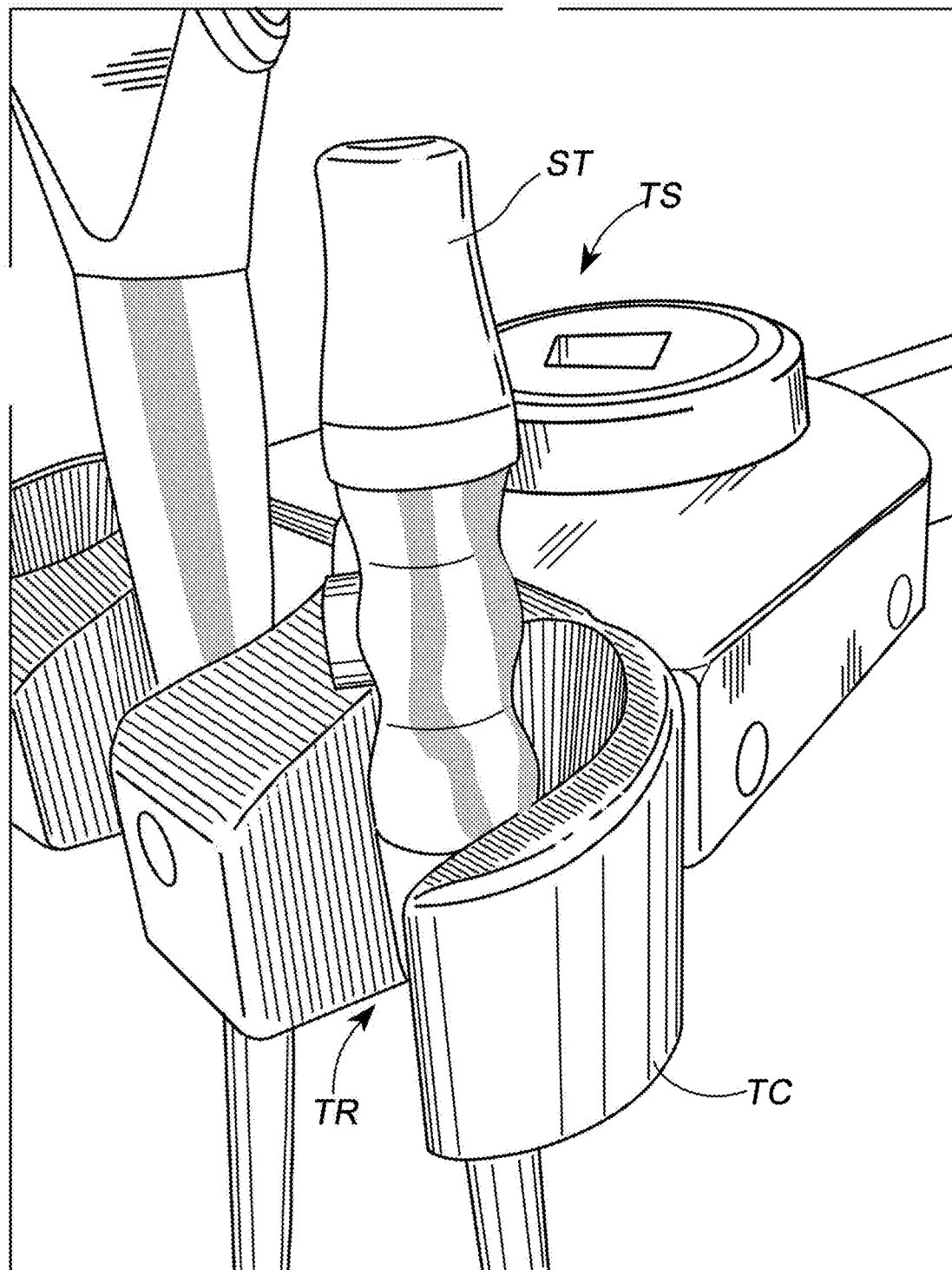
FIG. 1 is an environmental view showing a typical prior art dental tool holder.

ST suction tool
TC tool cradle
TS tool stand
TR tool receptacle
100 flexible tool holder
112 flexible arm
113a lower end
113b proximal end
114 flexible arm sheath
116 upper tool grip
118a, 118b tool attachment piece
120 access window
121 compressible or magnetic member
122, 123 hinging portion
124 conformable member
125 aperture
126, 128 displaceable member
127 axis
128 bearing
129 central member
130 elastomeric layer
132 reserved
134 spring recess
136 spring flange Definitions Unless otherwise explained, any technical terms used herein have the same meaning as commonly understood by one of ordinary skill in the art to which this disclosure belongs. The singular terms "a", "an", and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. It should be understood that the objects, features and aspects of any embodiment disclosed herein may be combined with any object, feature or aspect of any other embodiment without departing from the scope of the invention. The term "comprises" means "includes." All publications, patent applications, patents, and other references mentioned herein are incorporated by reference in their entirety for all purposes. In case of conflict, the present specification, including explanations of terms, will control. In addition, the materials, methods, and examples are illustrative only and not intended to be limiting.

Referring generally to FIGS. 1-12 which show various implementations of the present invention, a dental tool support 100 includes a flexible arm 112, sometimes termed a "gooseneck," covered by a sheath 114 thereabout, a proximal end of the flexible arm is connected to a conformable member 124 and a distal end of the flexible arm 112 is connected to a dental tool clamp or upper tool grip 116 that includes at least one attachment piece 118a, 118b. The conformable member 126 includes an axis 127 corresponding generally to the position of a central member 129 within the conformable member, wherein the central member is connected to the proximal end 113b of the flexible arm 112. The conformable member 124 includes a non-slip layer 130 that may be include an elastomeric cover. The conformable member 124 also includes displaceable members 126, 128 which may be beads circumjacent the central member 129 that are displaced by linear movement of the central member, or the displaceable members may comprise movable elements that move away from the axis or toward the axis, depending on linear movement of the central member within the conformable member. In some implementations, displaceable members may be reciprocating and may be radially located about the central member 129 and may include a resting position generally closer to the axis. In some implementations displaceable members may splay apart when portions of the central member force the elements apart. In some implementations, portions of displaceable members are biased toward the axis by spring or elastic elements (not shown) placed in a recess 134 of the conformable member 124 that bear against flanges 136 of the displaceable members. Alternatively, an elastomeric band or cover circumjacent the displaceable members may bias the displaceable members in a retracted state. In the implementations described herein, the displaceable members 126, 128 are displaced reversibly and outwardly by linear movement of the central member 129. In the implementations described, the diameter of the conformable member 124 is configured to change between a relatively lesser or greater diameter depending on the position of the central member 129 within the conformable member due to position of the displaceable members 126, 128 circumjacent the axis. When the diameter of the conformable member is increased, portions thereof are tightly forced against the sides of the tool cradle and inhibit lateral movement of the conformable member.

FIG. 1 shows a prior art dental tool cradle which is typical of dental hygienist tool holders and includes a tapering, generally conic aperture with a gap along one side to allow ready access to a held tool.

FIGS. 2A and 2B depict an implementation according to the present invention wherein the displaceable members 128 inside conformable member 124 are spherical beads 128 circumjacent central member 129 which may be thought of as a proximal extension of the flexible arm 112. When the conformable member 124 is placed in a tool recess of a tool holder, and the central member is forced or plunged in a downward direction, the beads are forced away from the center of the conformable member and distend the conformable member which is adapted to fill the inner contours of a prior art tool holder such as that depicted in (FIG. 1). In the particular implementation shown, the bead are contained in the body of the conformable member which is malleable and is able to maintain a shape, however in other implementations, the conformable member includes some resilient elements, such as an elastomeric outer wall 130 or cover. In some implementations, the displaceable members 128 are in a matrix of lubricative gel, and the conformable member is covered by an elastomeric layer or cover or a layer of memory foam which contracts and bulges according to the movement of the spherical beads. In some implementations, the displaceable members 128 are spherical beads which are magnetic and which are capable of maintaining a position and accordingly, an overall shape of the conformable member/anchoring member. In some implementations, the spherical beads are replaced with memory foam. In some implementations the displaceable members are made at least partially of a heavy metal. FIG. 2B shows a typical unformed conformable member prior to insertion into a tool recess, and FIG. 3 shows the conformable member of FIG. 2B joined to flexible arm 112 and wherein the conformable member where the contour of the conformable member 124 has been formed by insertion into a tool receptacle (TR) of a dental tool holder similar to that shown in (FIG. 1), one of many possible contours when the displaceable members are forced outwardly.

Figure 4:
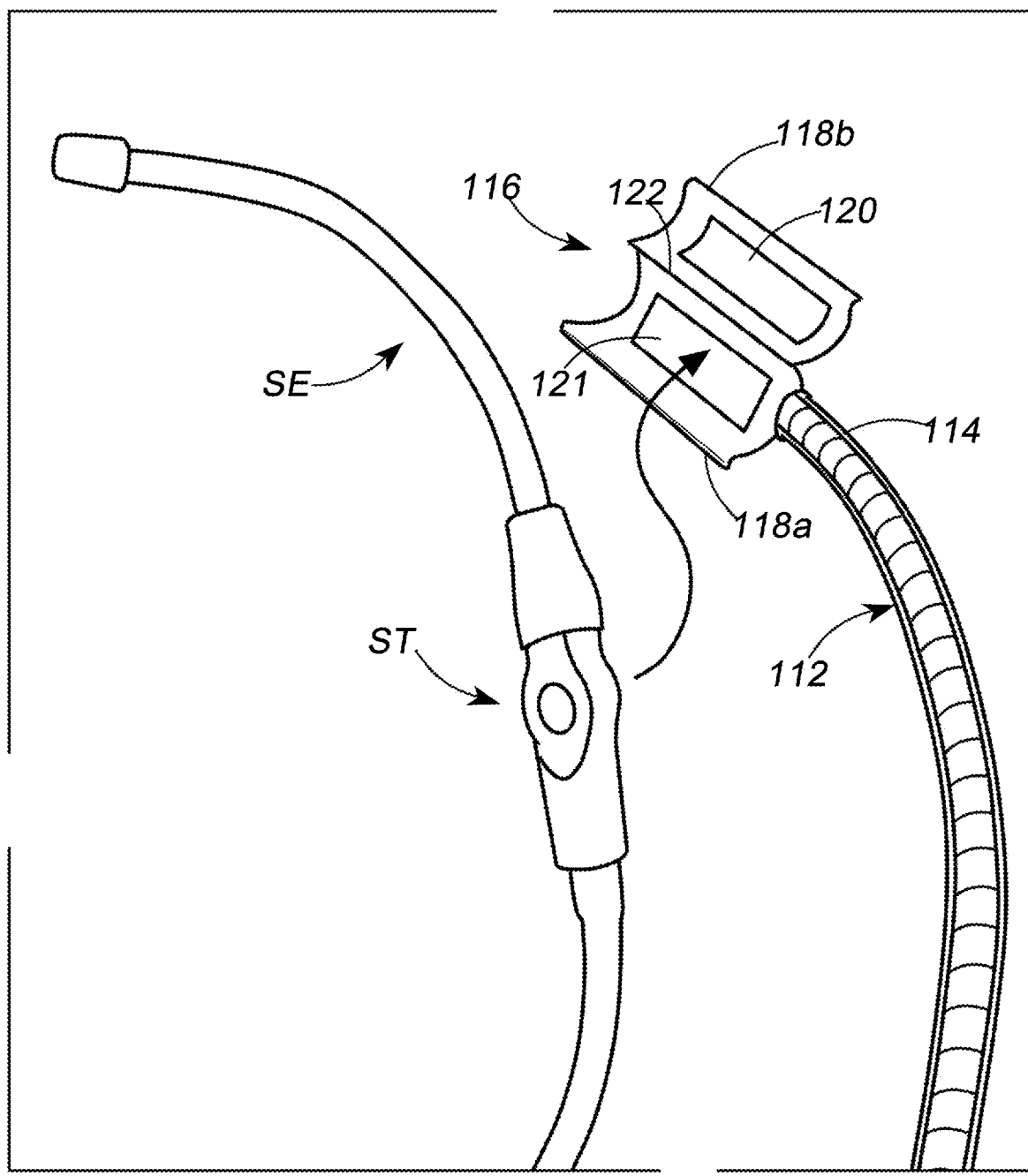
FIG. 4 is partial perspective view showing a dental suction device and a distal end of the implementation shown in (FIG. 3)
Figure 5:
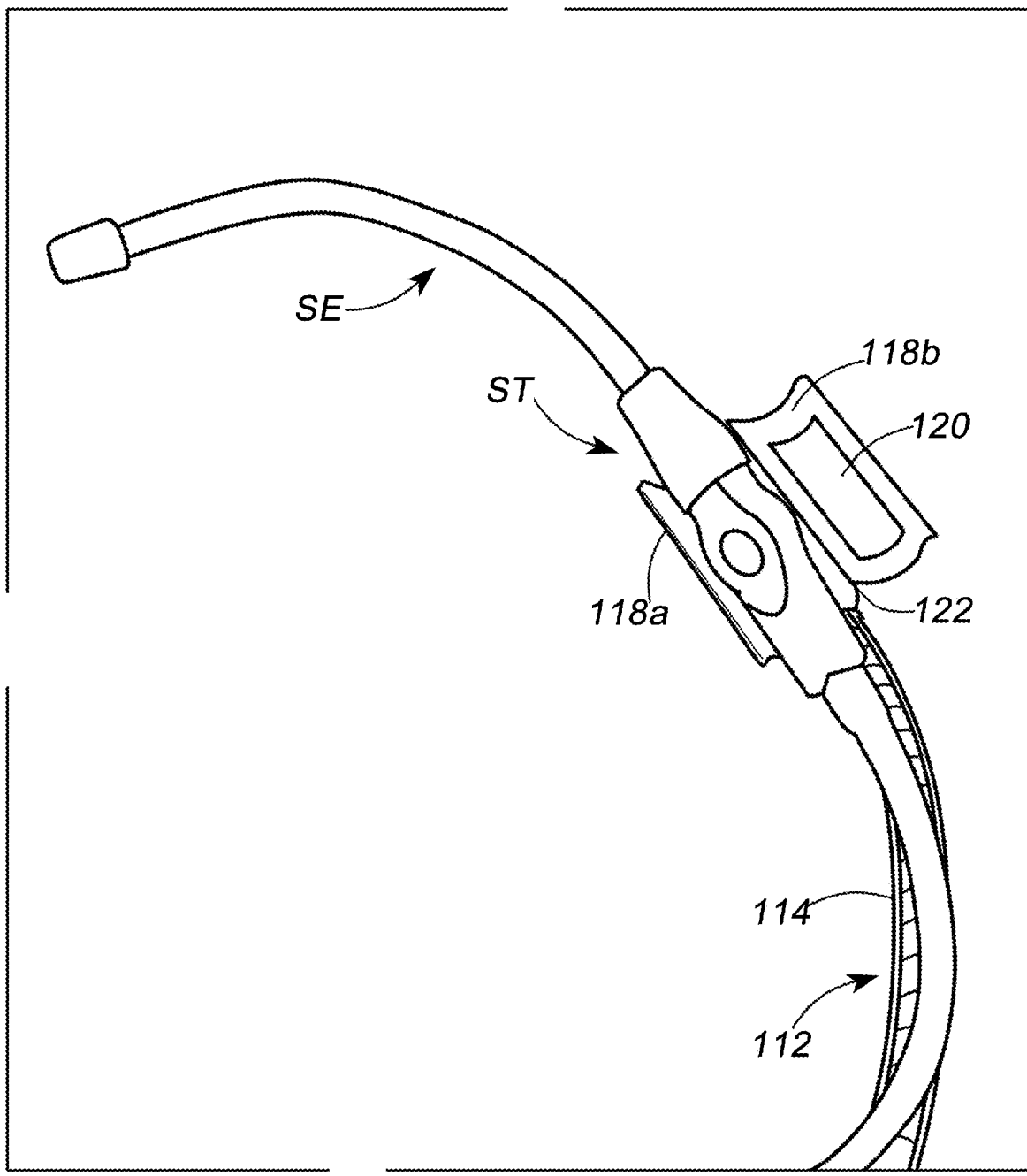
FIG. 5 is another partial perspective view thereof.

While FIGS. 4 and 5 show the flexible arm 112 with an upper tool grip 116 that includes hinge portion 122 between tool attachment members 118*a*, 118*b*, in some cases a magnet may be affixed to a dental tool ST corresponding to a magnetic element placed on or adjacent to compressible member 121. In the clamshell type grip shown, a window 120 may be placed on one or more of the tool attachment members in order to expose controls on sides of the dental tool. Tool attachment members 118*a*, 118*b* may be biased to maintain a normally closed position unless the tool attachment members are prised apart.

FIGS. 6 and 7 depict an implementation where the central member 129 includes tapering portions that are linearly movable within the conformable member 124 so that relatively larger diameter portions of the central member may transition between interior abutting portions of the conformable member of lesser diameter. The conformable member includes a hinge 123 that permits halves of the conformable member to splay when relatively greater diameter portions of the central member 129 are moved against relatively lesser diameter interior portions of the conformable member, and permits the halves to collapse together when relatively lesser diameter portions of the central member are moved against or disposed within relatively greater diameter portions of the conformable member. The halves may be coated or otherwise layered with a non-slip coating. The halves may include an elastic circumjacent band that provides contractile force. Alternatively, the halves may be encapsulated within an elastomeric bladder that includes a wall sufficiently thin such that the halves may expand when forced outwardly, yet contract when the central member is in the up position. While the implementation shown includes halves, it is possible that it be divided into quarters or another number of movable parts.

Figure 10:
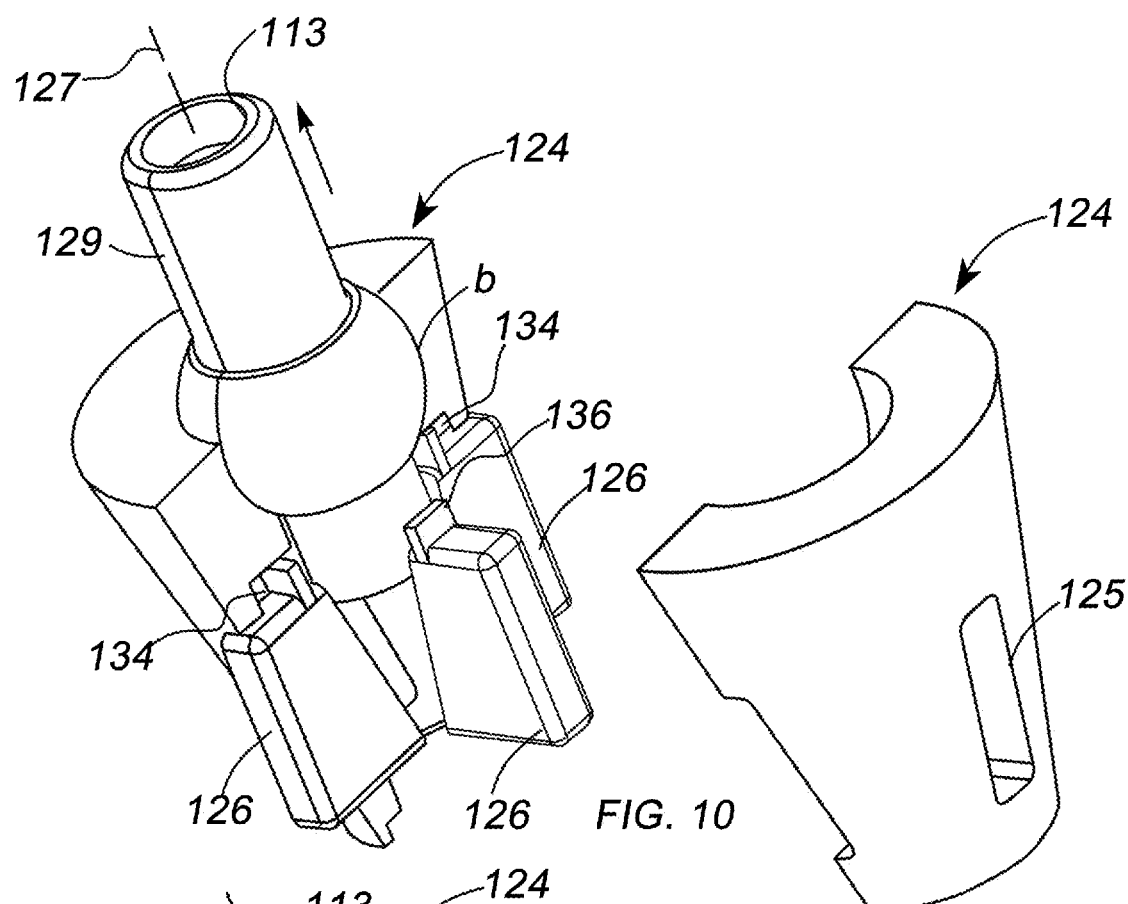
FIGS. 10 and 11 are exploded views of the implementation shown in (FIGS. 8 and 9)
Figure 11:
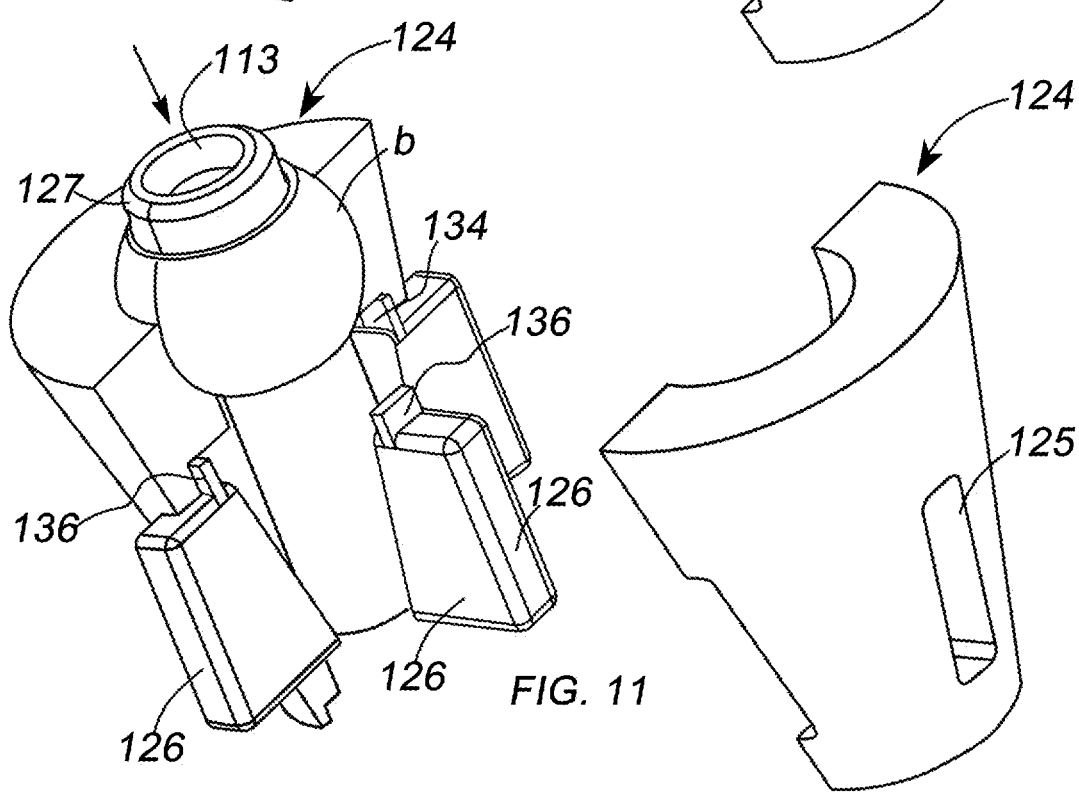

FIGS. 8 and 9 depict another implementation that includes displaceable members 126 that are arranged radially about axis 127. In similar fashion to the implementation shown in FIGS. 6 and 7, the central member is linearly movable within the conformable member 124. FIGS. 10 and 11 show respectively, the implementation in a contracted (lesser diameter) state and an expanded (greater diameter) state. Displaceable members 126 are normally biased in a contracted state by springs (not shown) placed in recesses 134. In the implementation shown, the displaceable members are sloped so that forcing the central member downwardly forces the displaceable members outwardly through apertures 125. The expandable members may be coated with a non-slip material such as an elastomeric material.

Figure 12:
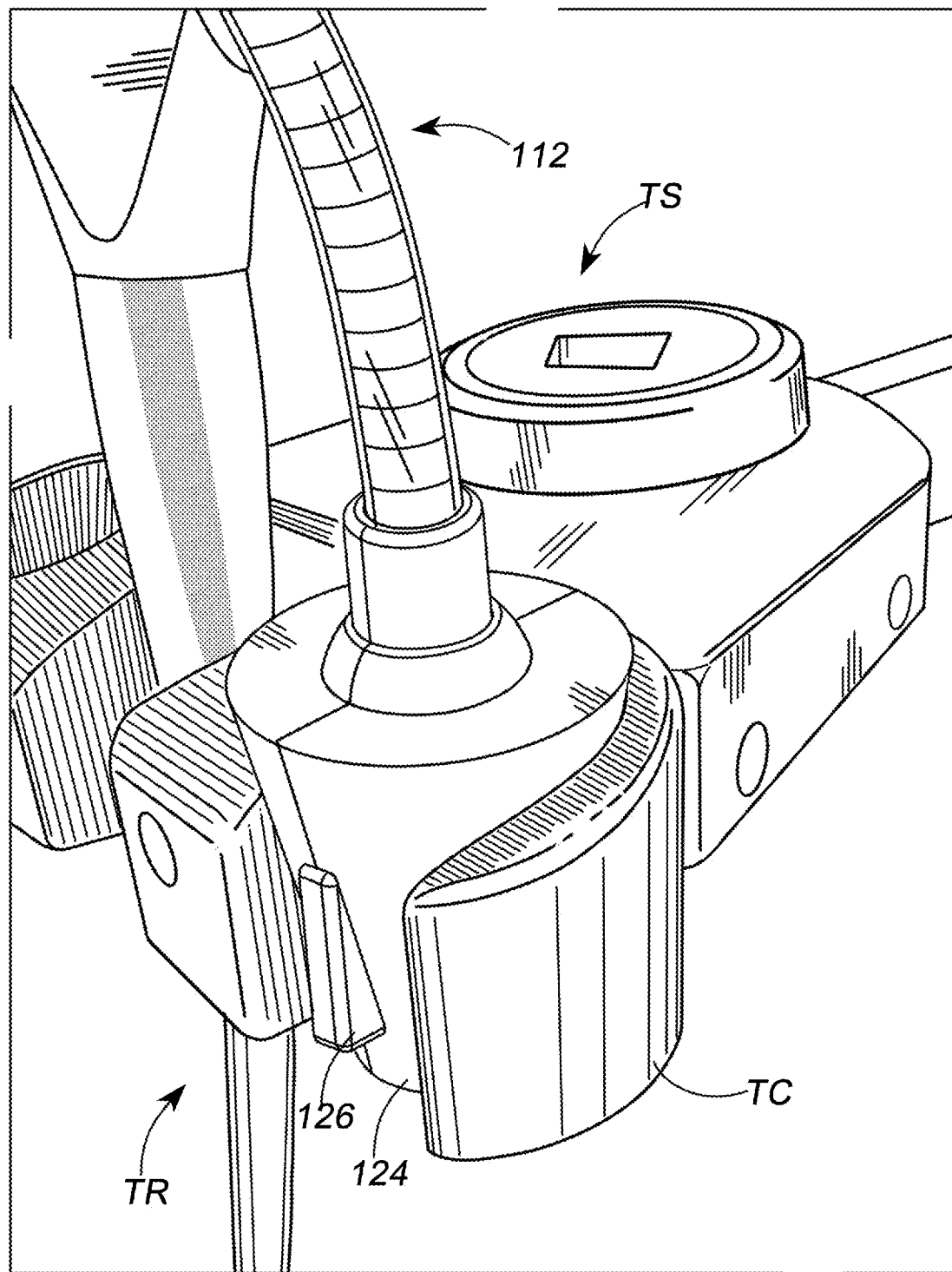
FIG. 12 depicts a typical environmental use of one or more implementations in accordance with the present invention.

FIG. 12 depicts the foregoing implementation in an expanded clamped state inside a tool recess of a tool cradle.

In any of the implementations shown, a central member is linearly movable between portions of a conformable member and displaces one or more elements to increase or decrease the diameter of the conformable member. Interior portions of the conformable member in contact with the central member may have a high co-efficient of friction so that slight lateral forces encountered by the flexible arm while in use will not be sufficient to overcome the positional relationship of the movable elements.

It should be understood that the drawings and detailed description herein are to be regarded in an illustrative rather than a restrictive manner, and are not intended to be limiting to the particular forms and examples disclosed. Accordingly, it is intended that this disclosure encompass any further modifications, changes, rearrangements, substitutions, alternatives, design choices, and embodiments as would be appreciated by those of ordinary skill in the art having benefit of this disclosure, and falling within the spirit and scope of the following claims.

What is claimed is:

1. A tool holder apparatus comprising:
   a bendable portion including a first end and a second end opposite the first end, the bendable portion configured to maintain a position when bent;
   a quick release tool holder member located at the first end;
   a quick release tool grip located at the second end, the quick release grip including at least one anchoring member, the anchoring member includes a passageway through which a portion of the second end of the bendable portion extends and displaceable members surrounding the passageway are configured to move away from the passageway or move toward the passageway in response to positional change of the portion of the second end within the passageway.

2. The tool holder apparatus according to claim 1, the quick release tool grip further comprising a clamping portion.

3. The tool holder apparatus according to claim 1, the portion of the second end further configured for plunging movement within the anchoring member.

4. The tool holder apparatus according to claim 1, the anchoring member further comprising an elastomeric surface.

* * * * *